(12) United States Patent
Loeser et al.

(10) Patent No.: US 8,037,090 B2
(45) Date of Patent: Oct. 11, 2011

(54) PROCESSING STRUCTURED DOCUMENTS STORED IN A DATABASE

(75) Inventors: Henrik Loeser, San Jose, CA (US);
Robbert C. Van der Linden, Scotts Valley, CA (US); Brian S. Vickery, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 12/398,716

(22) Filed: Mar. 5, 2009

(65) Prior Publication Data

US 2009/0171926 A1 Jul. 2, 2009

Related U.S. Application Data

(63) Continuation of application No. 11/530,839, filed on Sep. 11, 2006, now Pat. No. 7,512,608.

(51) Int. Cl.
*G06F 17/30* (2006.01)

(52) U.S. Cl. ........ 707/770; 707/715; 707/741; 715/229; 715/234

(58) Field of Classification Search .................. 707/802, 707/803, 804, 770, 715, 741; 715/227, 229, 715/234

See application file for complete search history.

(56) References Cited

U.S. PATENT DOCUMENTS

| | | | |
|---|---|---|---|
| 5,642,514 A | 6/1997 | Peckham | |
| 5,956,704 A | 9/1999 | Gautam et al. | |
| 6,212,629 B1 | 4/2001 | McFarland et al. | |
| 6,236,996 B1 | 5/2001 | Bapat et al. | |
| 6,308,173 B1 | 10/2001 | Glasser et al. | |
| 6,366,934 B1 | 4/2002 | Cheng et al. | |
| 6,421,656 B1 | 7/2002 | Cheng et al. | |
| 6,480,865 B1 | 11/2002 | Lee et al. | |
| 6,487,566 B1 | 11/2002 | Sundaresan | |
| 6,502,101 B1 | 12/2002 | Verprauskus et al. | |
| 6,519,597 B1 | 2/2003 | Cheng et al. | |
| 6,581,060 B1 | 6/2003 | Choy | |
| 6,581,062 B1 | 6/2003 | Draper et al. | |
| 6,631,371 B1 | 10/2003 | Lei et al. | |
| 6,658,652 B1 | 12/2003 | Alexander et al. | |
| 6,757,680 B1 | 6/2004 | Choy | |
| 6,785,728 B1 | 8/2004 | Schneider et al. | |
| 6,804,677 B2 | 10/2004 | Shadmon et al. | |
| 6,938,204 B1 | 8/2005 | Hind et al. | |
| 7,171,430 B2 | 1/2007 | Loeser et al. | |

(Continued)

FOREIGN PATENT DOCUMENTS

| | | |
|---|---|---|
| EP | 0992873 A2 | 4/2000 |
| WO | WO 03/005236 A2 | 1/2003 |

OTHER PUBLICATIONS

Damiani, Ernesto et al., "A Fine-Grained Access Control System for XML Documents", ACM Transactions on Information and System Security, vol. 5, No. 2, May 2002, pp. 169-202.

Lyons, Seamus et al., "Domain-Specific Information Extraction Structures", Proceedings of the 13th International Workshop on Database and Expert Systems Applications (DEXA '02), 2002, pp. 1-5.

(Continued)

*Primary Examiner* — Shahid Alam
(74) *Attorney, Agent, or Firm* — Stephen J. Walder, Jr.; Elissa Y. Wang (57) ABSTRACT

A method, computer readable medium, and system for processing a structured document are disclosed. The method, computer readable medium, and system include identifying a plurality of strings processed by a database, assigning an identifier to each of the plurality of strings, storing each of the plurality of strings and its assigned identifier in a table in the database, and utilizing the table during document processing.

9 Claims, 6 Drawing Sheets

U.S. PATENT DOCUMENTS

| | | |
|---|---|---|
| 7,512,608 B2 | 3/2009 | Loeser et al. |
| 2002/0099715 A1 | 7/2002 | Jahnke et al. |
| 2002/0156811 A1 | 10/2002 | Krupa |
| 2004/0044959 A1 | 3/2004 | Shanmugasundaram et al. |

OTHER PUBLICATIONS

USPTO U.S. Appl. No. 10/652,662, Image File Wrapper printed Nov. 30, 2010, 1 page.

USPTO U.S. Appl. No. 11/530,839, Image File Wrapper printed Nov. 30, 2010, 2 pages.

| String 202 | String ID 204 | Status (T or P) 206 |
|---|---|---|
| Element A (202a) | 0001 (204a) | P (206a) |
| Element B (202b) | 0002 (204b) | P (206b) |
| Attribute C (202c) | 0003 (204c) | P (206c) |
| Constructed Element D (202d) | 0004 (204d) | T (206d) |
| Constructed Element E (202e) | 0005 (204e) | T (206e) |

PROCESSING STRUCTURED DOCUMENTS STORED IN A DATABASE

This application is a continuation of U.S. patent application Ser. No. 11/530,839 filed Sep. 11, 2006, now U.S. Pat. No. 7,512,608.

FIELD OF THE INVENTION

The present invention relates generally to computer implemented database systems and, more particularly, to an improved method and system for processing structured documents stored in a database system.

BACKGROUND OF THE INVENTION

Structured documents are documents which have nested structures. Documents written in Extensible Markup Language (XML) are structured documents. XML is quickly becoming the standard format for delivering information over the Internet because it allows the user to design a customized markup language for many classes of structured documents. For example, a business can easily model complex structures such as purchase orders in XML format and send them for further processing to its business partners. XML supports user-defined tags for better description of nested document structures and associated semantics, and encourages the separation of document content from browser presentation.

As more and more businesses present and exchange data in XML documents, database management systems (DBMSes) have been developed to store, query and retrieve these documents which are typically stored on direct access storage devices (DASD), such as magnetic or optical disk drives for semi-permanent storage. Some DBMSes, known as relational databases, store and query the documents utilizing relational techniques, while other DBMSes, known as native databases, store the documents in their native formats.

As stated above, one attractive feature of XML is that it allows the user to design a customized markup language for many classes of structured documents. The user can select element and attribute names that are relevant to and descriptive of the particular class of document. While this provides the user with great flexibility, it also presents problems for database processing. Evaluating strings corresponding to element names is costly because the strings are of varying length and the database processor, at a minimum, must perform length checks. Such length checks add costs during runtime and also complicate program coding. In addition, processing variable length strings complicates memory management in the database. Moreover, in order to store XML documents in their native format in a database, the element and attribute names, along with other strings, must be stored on disk. For large documents, the amount of disk space required to store a collection of such documents can be quite large and expensive.

To alleviate the storage problem, it is common to compress a document in order to reduce the amount of storage space required to store it. A typical compression method involves replacing certain strings with numbers and storing mapping information in a file specific or document specific table. The mapping table is stored in front of the file or document. While this method reduces the size of the document, it also presents several disadvantages in the storage processing of such documents. First, storing the mapping information in each file/document requires additional disk space for each file/document. Second, because each compressed file/document is associated with its own mapping table, the numbers associated with the strings in one compressed file/document do not correspond to the same strings in a different compressed file/document. Accordingly, because the numbers are not consistent throughout the database, the numbers cannot be used for purposes beyond document compression. Instead, the compressed documents must be decompressed before they can be processed. Once the document is decompressed, i.e., the numbers are replaced with the associated strings, the query processor is still required to evaluate strings.

Accordingly, a need exists for an improved method and system for processing structured documents stored in a database. The method and system should reduce the size of a structured document for storage, while supporting homogeneous document processing. The present invention addresses such a need.

SUMMARY OF THE INVENTION

A method, computer readable medium, and system for processing a structured document are disclosed. The method, computer readable medium, and system provide for identifying a plurality of strings processed by the database, assigning an identifier to each of the plurality of strings, storing each of the plurality of strings and its assigned identifier in a table in the database, wherein at least one of the plurality of strings is not derived from one or more structured documents stored in the database and at least another of the plurality of strings is derived from the one or more structured documents stored in the database, and utilizing the table during document processing.

According to an embodiment, a global association table is provided to store strings and their respective identifiers. The strings correspond to element names, attribute names, and namespaces in one embodiment. Because a global association table is utilized, an identifier for a particular string can be used in place of the string throughout the database. By replacing strings with their respective identifiers, document processing and storage are significantly improved.

DETAILED DESCRIPTION

The present invention relates generally to computer implemented database systems and, more particularly, to an improved method and system for processing structured documents stored in their native format in a database. The following description is presented to enable one of ordinary skill in the art to make and use the invention and is provided in the context of a patent application and its requirements. Various modifications to the embodiment and the generic principles and features described herein will be readily apparent to those skilled in the art. For example, the following discussion is presented in the context of a DB2® database environment available from IBM® Corporation. It should be understood that the present invention is not limited to DB2® and may be implemented with other database management systems. Thus, the present invention is to be accorded the widest scope consistent with the principles and features described herein.

According to an embodiment of the present invention, an identifier is assigned to each of a plurality of strings that is processed by the database, and the string and its assigned identifier are stored in a global database table. Because the global database table comprises strings used throughout the database, it is not limited to a single file or document. Thus, the table is associated with the database, and not with a particular file or document in the database. In one embodiment, strings associated with element names, attribute names and namespaces, and their respective identifiers are stored in the table.

Figure 1:
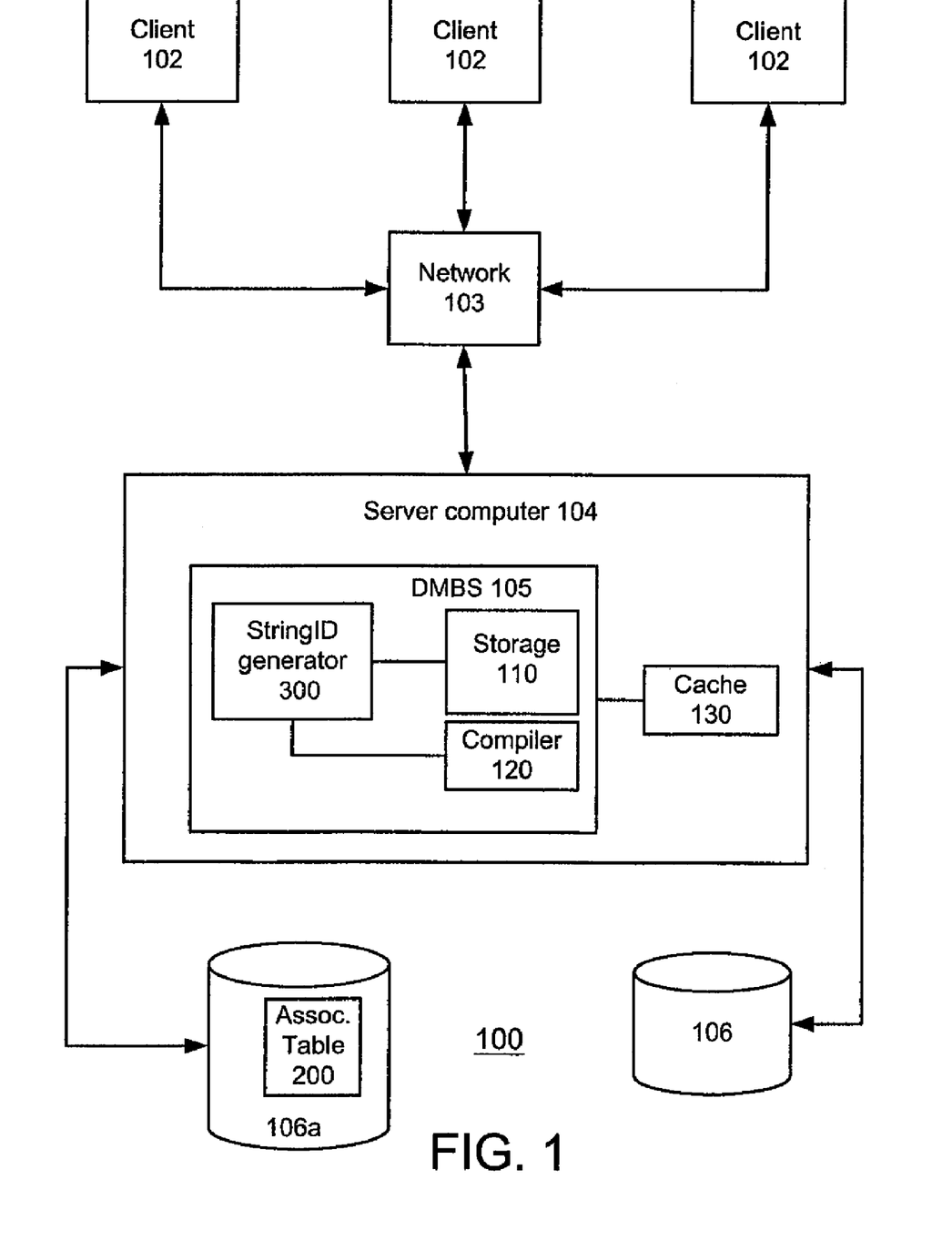
FIG. 1 is a block diagram of an exemplary computer environment for use with the present invention.

To describe further the present invention, please refer to FIG. 1, which is an exemplary computer environment for use with the present invention. In FIG. 1, a typical distributed computer system 100 utilizes a network 103 to connect client computers 102 executing client applications to a server computer 104 executing software and other computer programs, and to connect the server computer 104 to data stores 106. These systems are coupled to one another by various networks, including LANs, WANs, and the Internet. Each client computer 102 and the server computer 104 additionally comprise an operating system and one or more computer programs (not shown).

The server computer 104 uses a data store interface (not shown) for connecting to the data stores 106. The data store interface may be connected to a database management system (DBMS) 105, which supports access to the data stores 106. The DBMS 105 can be a relational database management system (RDBMS) capable of storing structured documents in their native formats, such as the DB2® system developed by IBM® Corporation, or it also can be a native XML database system. The interface and DBMS 105 may be located at the server computer 104 or may be located on one or more separate machines. The data stores 106 may be geographically distributed.

The DBMS 105 and the instructions derived therefrom are all comprised of instructions which, when read and executed by the server computer 104 cause the server computer 104 to perform the steps necessary to implement and/or use the present invention. The exemplary environment illustrated in FIG. 1 is not intended to limit the present invention, and alternative environments may be used without departing from the scope of the present invention. For instance, while a single server computer system 104 is illustrated, it is well understood that multiple processing systems, known as nodes, could be linked to the network 103 in a Massively Parallel Processing (MPP) environment.

Figure 2A:
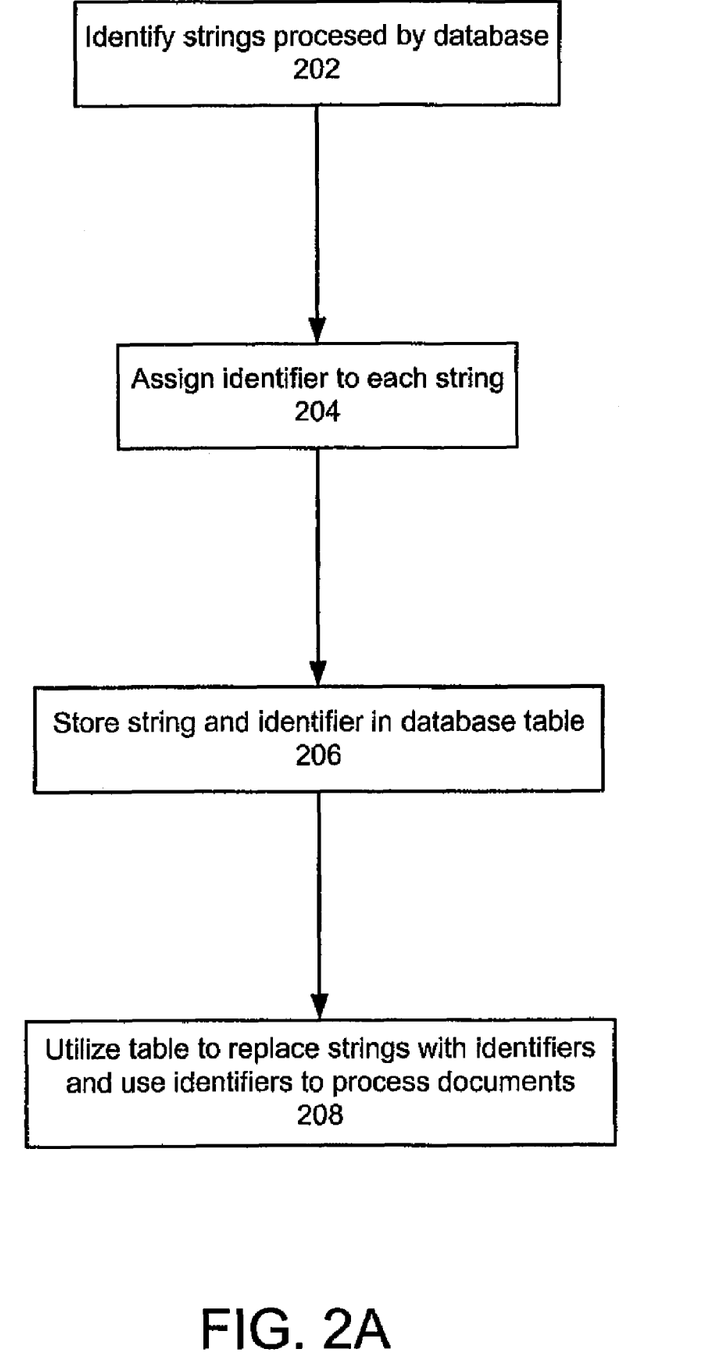
FIG. 2A is a flowchart illustrating a method for processing a structured document stored in a database according to the embodiment of the present invention.

FIG. 2A is a flowchart illustrating a method for processing a structured document stored in a database according to the embodiment of the present invention. In step 202, a plurality of strings processed by the DBMS 105 are identified. An identifier is then assigned to each of the plurality of strings in step 204. In step 206, the strings and their respective identifiers are stored in a table, and in step 208, the DBMS 105 utilizes the table to replace the plurality of strings with their assigned identifiers. Thereafter, the identifiers, as opposed to the strings, are used during document processing.

Referring again to FIG. 1, an association table 200 is provided. The association table is stored on-disk in the database 106a in the embodiment. In an MPP environment, the association table 200 may be stored in a catalog node in order to avoid adding a new single point of failure. The association table 200 is a database-global table, i.e., the entire database system shares the association table 200, and is a dictionary that maps strings to identifiers, hereinafter referred to as StringIDs. In an embodiment, the strings include all element names, attribute names, namespace Uniform Resource Identifiers (URIs), and namespace prefixes found in documents stored in the database. By replacing strings with their respective StringIDs, document processing and storage are significantly improved.

Figure 2B:
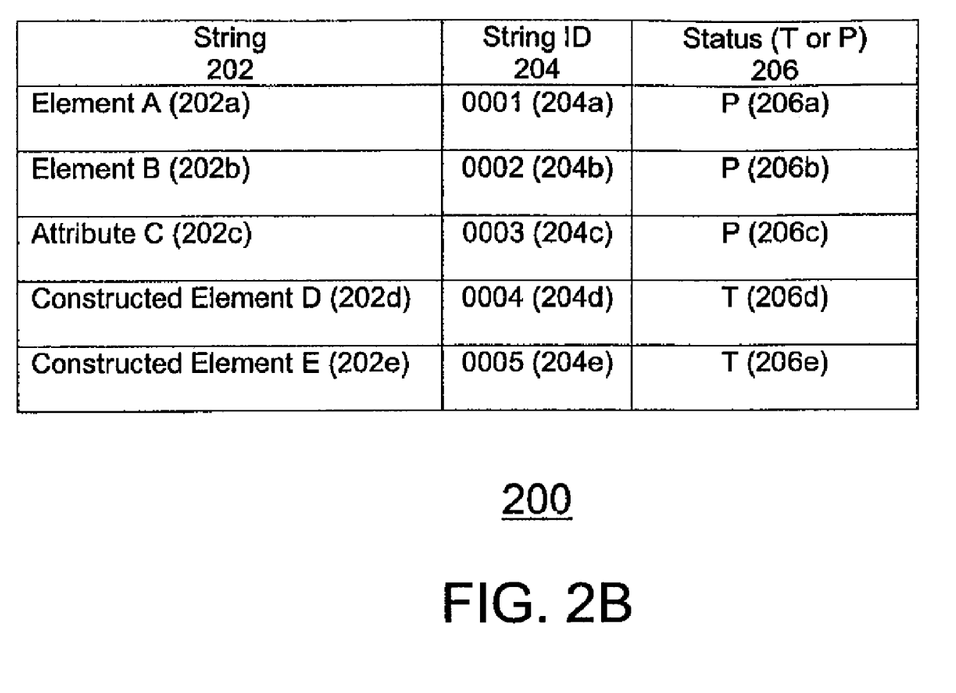
FIG. 2B is an association table according to an embodiment of the present invention.

Shown in FIG. 2B is an exemplary association table 200 according to an embodiment of the present invention, where the table 200 is a conventional relational, e.g., SQL, table. As is shown, the table 200 comprises a string column (202) and a StringID column (204). The string column (202) contains the strings corresponding to, for example, elements (e.g., 202a and 202b), attributes (e.g., 202c), and namespaces (not shown). The StringID column (204) contains the StringIDs (204a-204e) associated with the strings (202a-202e).

In one embodiment, each StringID is a fixed size integer representing a variable length string. The StringID is used in place of the string throughout the database For example, during storage, the DBMS 105 stores a StringID of an element's name and a StringID of the element's namespace instead of the corresponding variable length strings. In another example, during query processing, variable length strings in the query are converted to their respective StringIDs and therefore, the StringIDs in the query, and not the variable length strings, are compiled and executed. In summary, the StringIDs instead of the strings are utilized for storage and internal processing of the database.

Several advantages flow from this utilization. First, because the StringID is generally smaller than its corresponding string, storing the StringID requires less storage space than storing the string. Thus, the StringID is used to compress the document and less disk space is required to store documents. Also, any other related database components, e.g., indices or a path table, require less storage space. Second, because the association table is global, a separate mapping table is not required to be stored with each document and the StringIDs can be utilized for homogeneous processing. Third, because the StringIDs are of a fixed size (e.g., four bytes) and consistent throughout the database, internal processing is simplified and performance improved. For instance, because StringIDs are fixed sized integers, comparing them, as opposed to variable length strings, is more efficient and less complicated.

As stated above, some of the strings in the association table 200 are those found in documents stored in the database. In an embodiment, the association table 200 also includes strings found in sources other than stored documents. For example, a query can introduce new element and attribute names based on a new document created from the result of the query. Such elements and attributes are referred to as "constructed" elements and attributes to distinguish them from those found in documents stored in the database. The strings associated with constructed elements (e.g., 202d and 202e) and attribute names are stored in the association table 200 and assigned a StringID (e.g., 204d and 204e). By doing so, the strings in the query can also be converted to StringIDs, which ensures homogeneous processing throughout the database.

According to the embodiment, the association table 200 further comprises a status column (206) that indicates whether a string is "temporary" or "permanent." Strings derived from documents stored in the database (e.g., 202a, 202b, and 202c) are assigned "permanent" or "P" status because such strings are repeatedly used in document processing. Strings derived from sources other than documents stored in the database (e.g., 202d and 202e), for instance, from a query, are assigned "temporary" or "T" status because they are generally utilized once, e.g., during compile and execution of the query. Thus, a database administrator can utilize the DBMS 105 to automatically manage the size and content of the association table 200 by periodically checking the status column 206 of each string (202a-202e) and deleting those strings whose status is temporary (206d, 206e).

Figure 3:
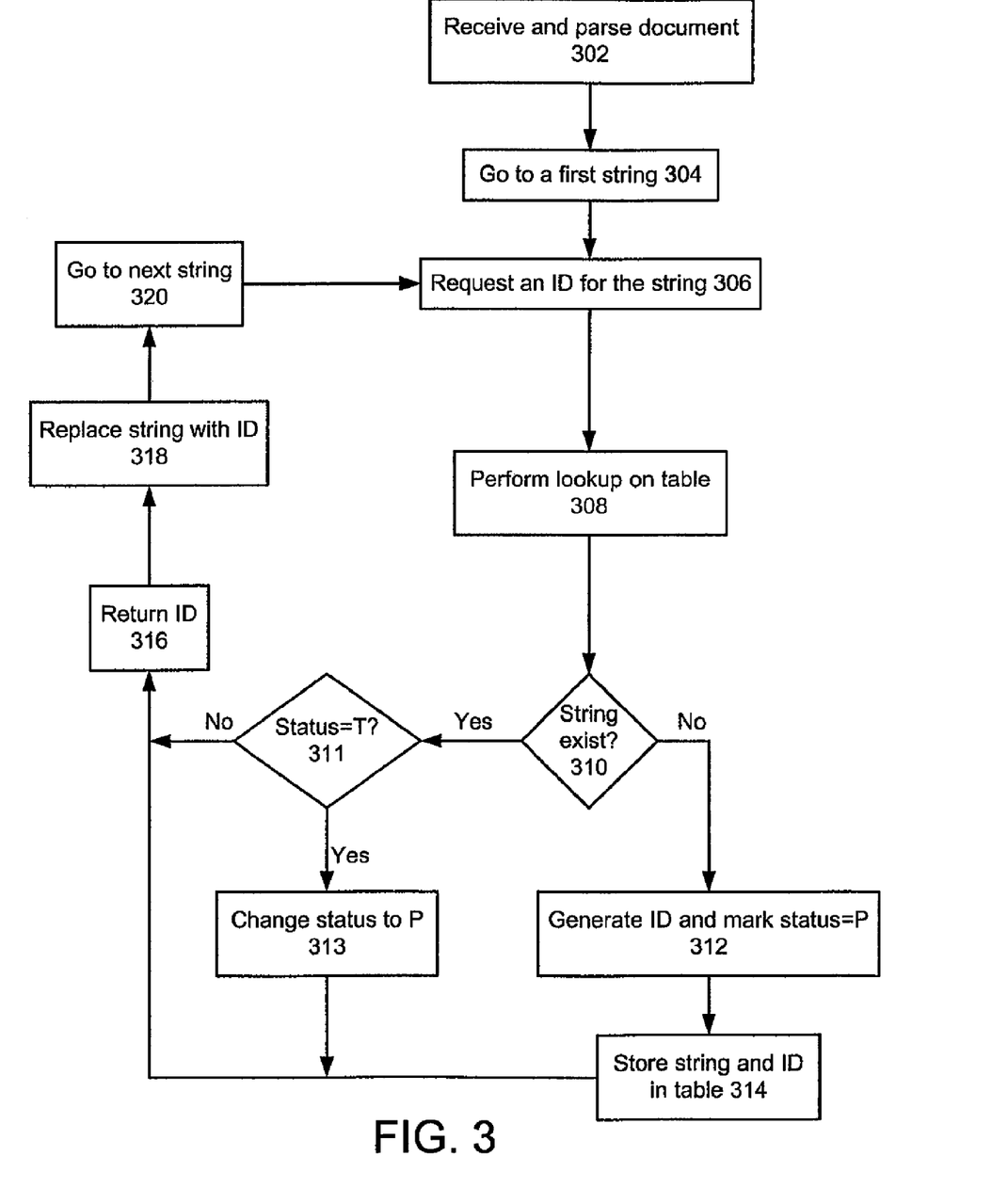
FIG. 3 is a flowchart illustrating a method for utilizing the association table during document storage according to an embodiment of the present invention.

To describe how the association table 200 is utilized in step 208 of FIG. 2A, please refer now to FIG. 1, FIG. 2B and FIG. 3. FIG. 3 is a flowchart illustrating a method for utilizing the association table 200 during document storage according to an embodiment of the present invention. As is shown in FIG. 1, the DBMS 105 includes a StringID generator 300, which is utilized by processing mechanisms in the DBMS 105, e.g., a storage mechanism 110 and a compiler 120, to request and procure StringIDs (204a-204e) for strings (202a-202e).

The process begins at step 302 when the storage mechanism 110 receives and parses a structured document that is to be stored in the database 106a. In one embodiment, the storage mechanism 110 stores the structured document as a plurality of nodes that form a node tree. Note that the nodes forming the node tree are not related to the nodes in an MPP environment. Bach node in the tree includes its name, its namespace and its path. In order to minimize the size of the node, the strings associated with the name and namespace are converted to their respective StringIDs. Thus, in step 304, the storage mechanism 110 considers a first string (e.g., 202a) in the document and in step 306, requests a StringID for the string from the StringID generator 300.

In step 308, the StringID generator 300 performs a lookup on the association table 200 for the string. If the string is found in the association table 200 (step 310), the StringID generator 300 then determines whether the string's status is temporary (in step 311) by checking the status column 206. If the string's status is not temporary, i.e., its status is permanent, then the StringID generator 300 returns the StringID (e.g., 204a) corresponding to the string to the storage mechanism 110 in step 316. If the string's status is temporary, the StringID generator 300 changes the status to permanent in step 313 and returns the StringID in step 316. The StringID generator 300 changes the string's status from temporary to permanent because the string is derived from a document that is, or will be, stored in the database.

If the string is not found in the association table 200 (step 310), the StringID generator 300 creates a new StringID for the string and marks the new string's status as permanent in step 312. In step 314, the new string, its StringID and its status is inserted into and stored in the association table 200. Next, the StringID generator 300 returns the new StringID to the storage mechanism 110 in step 316.

Once the StringID is returned, the storage mechanism 110 replaces the string (e.g., 202a) with its StringID (e.g., 204a) in step 318, and considers a next string (e.g., 202b) in the document via step 320. Steps 306 through 320 are repeated until the storage mechanism 110 has replaced all of the strings with their respective StringIDs. The storage mechanism 110 then proceeds with its normal processing steps to store the document in its native format in the database.

Figure 4:
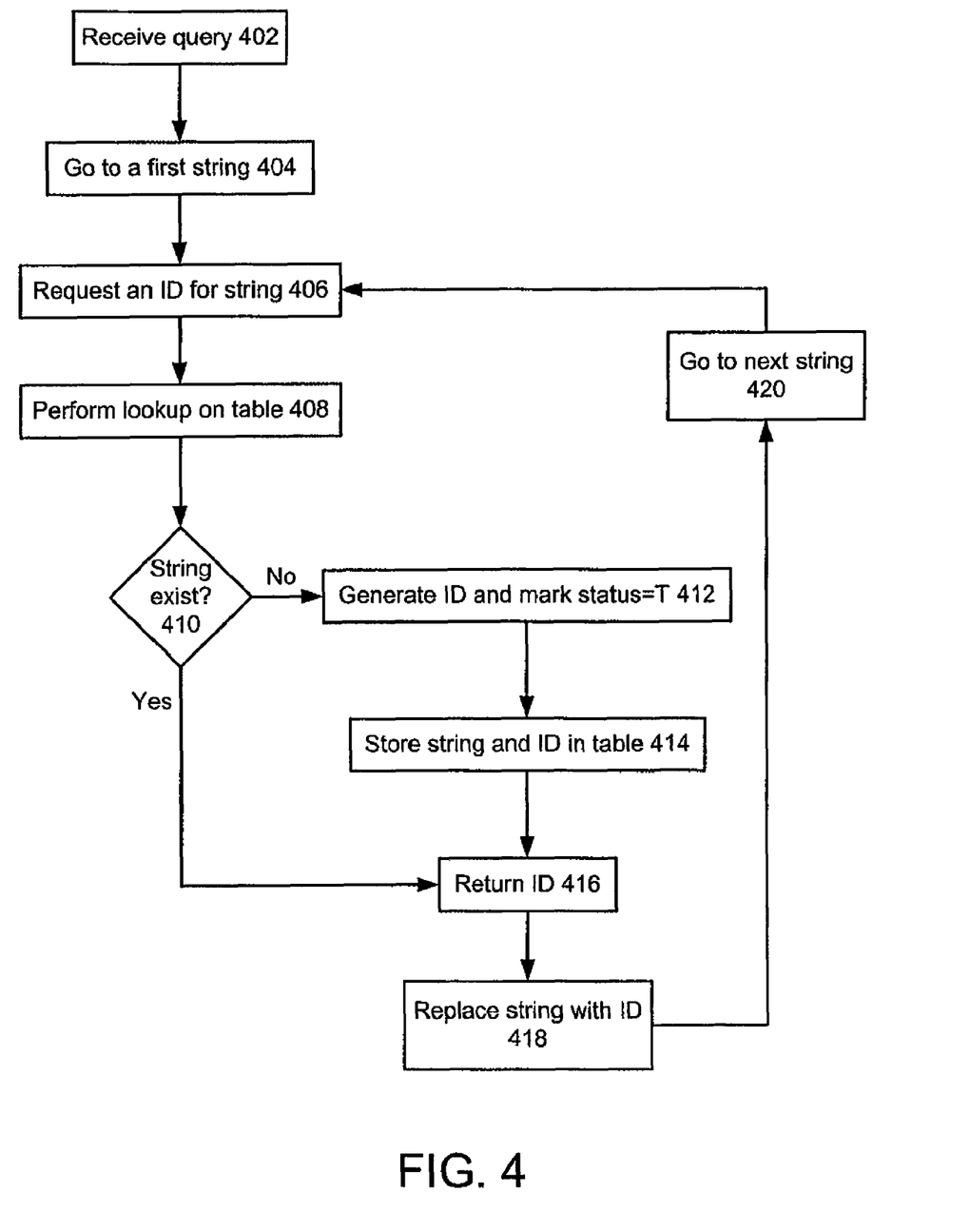
FIG. 4 is a flowchart illustrating a method for utilizing the association table during query processing according to an embodiment of the present invention.

Another example of how the association table 200 is utilized in step 208 of FIG. 2A is described in FIG. 4. FIG. 4 is a flowchart illustrating a method for utilizing the association table 200 during query processing according to an embodiment of the present invention. The process begins in step 402 when a query is received by the compiler 120. Typically, the query comprises a request to access at least one node in a document in a collection of documents. In an embodiment, the query comprises a path to the requested node. The path is a "road map" to the node and comprises the names of the nodes in the node tree that lead to the requested node. According to the embodiment, the compiler 120 converts the query from a collection of strings to a collection of StringIDs.

In step 404, the compiler 120 considers a first string. The compiler 120 then requests a StringID for the string from the StringID generator 300 in step 406. In step 408, the StringID generator 300 performs a lookup on the association table 200 for the string. If the string is found in the association table 200 (step 410), the StringID generator 300 returns the StringID corresponding to the string to the compiler 120 in step 416. If the string is not found in the association table 200 (step 310), the string is a constructed string. As such, the StringID generator 300 creates a new StringID for the constructed string and marks the constructed string's status as temporary in step 412. In step 414, the constructed string, its StringID, and its status are inserted into and stored in the association table 200. Next, the StringID generator 300 returns the new StringID to the compiler 120 in step 416.

Once the StringID is returned, the compiler 120 replaces the string with its StringID in step 418, and considers a next string in the document via step 420. Steps 406 through 420 are repeated until the compiler 120 has replaced all of the strings in the query with their respective StringIDs. The compiler 120 then proceeds with its normal processing steps, such as optimizing the query, and generating an executable plan to access the data in the documents.

Figure 5:
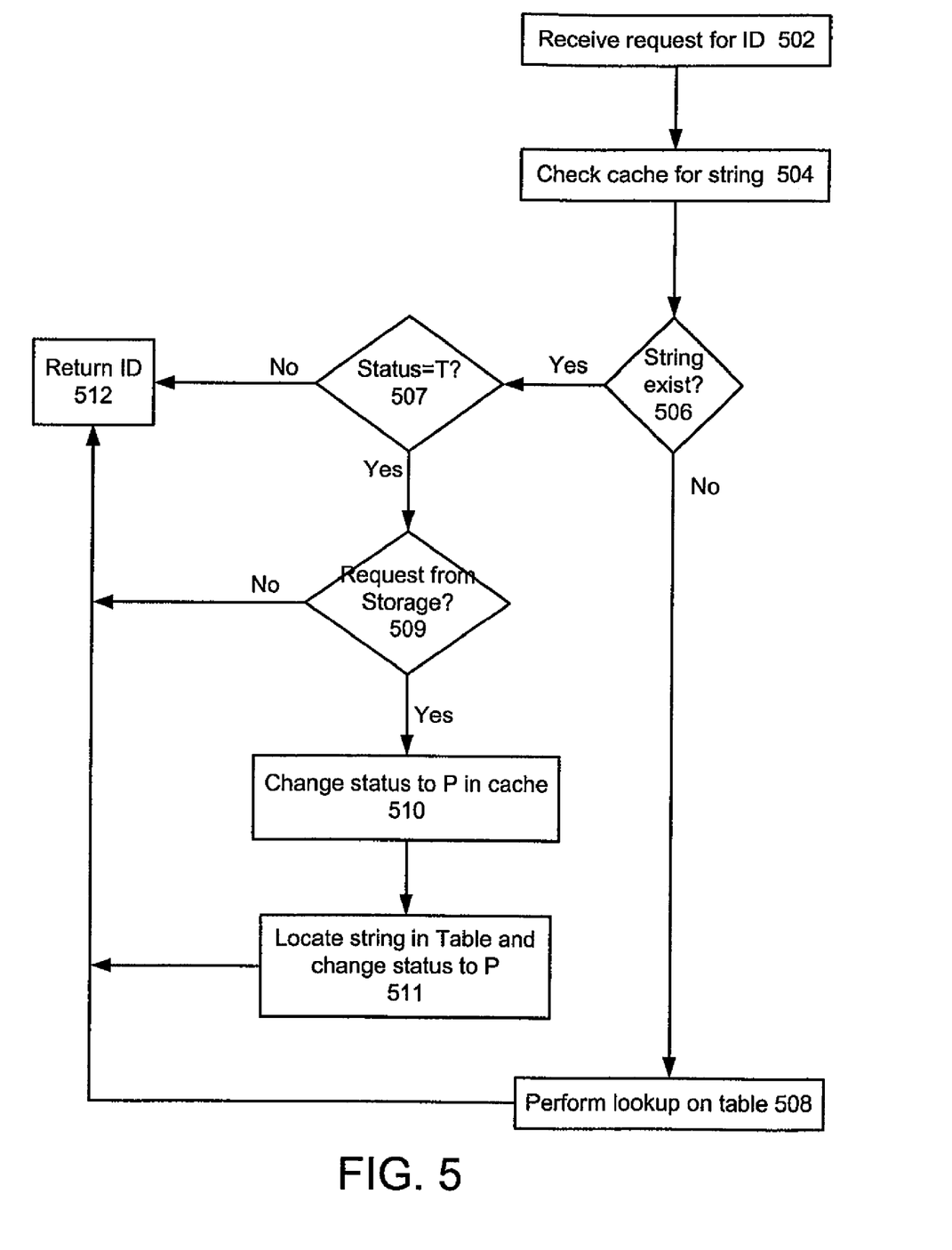
FIG. 5 is a flowchart illustrating how the cache is utilized when a request for a string identifier is processed according to the embodiment of the present invention.

In one embodiment, a cache 130 (FIG. 1) is provided in the server 104 to store portions of the association table 200 so that access to the association table 200 is minimized. FIG. 5 is a flowchart illustrating how the cache 130 is utilized when a request for a StringID is processed according to an embodiment of the present invention. In step 502, the StringID generator 300 receives a request from a requesting mechanism for a StringID and checks the cache 130 for the string in step 504. If the string is located in the cache 130 (step 506), the StringID generator 300 determines whether the string's status is temporary in step 507. If the string's status is not temporary, i.e., the string status is permanent, the corresponding StringID is returned from the cache 130 to the requesting mechanism in step 512.

If the string's status is temporary (step 507), the StringID generator 300 determines whether the requesting mechanism is the storage mechanism 110 (step 509). If the storage mechanism 110 is not the requesting mechanism, then the StringID from the cache 130 is returned to the requesting mechanism in step 512. Otherwise, i.e., the storage mechanism 110 is the requesting mechanism, the string's status is changed to permanent in the cache 130 (step 510). In order to preserve coherency between the cache 130 and the association table 300, the StringID generator 300 then locates the string in the association table 200 and changes the string's status to permanent in step 511. Thereafter, the StringID from the cache 130 is returned to the storage mechanism in step 512.

If the string is not in the cache 130 (step 506), the StringID generator 300 performs a lookup on the association table 300 in step 508. Here, the StringID generator 300 processes the request as before described in steps 310 through 314 in FIG. 3, or as described in steps 410 through 414 in FIG. 4. After the lookup, the StringID generator 300 returns the StringID to the requesting mechanism in step 512. In one embodiment, the StringID generator 300 also stores the string, its StringID, and the status in the cache 130.

In an embodiment, the cache 130 can store strings that are particularly relevant to the server 104. A database administrator can stock the cache 130 with default entries from the association table 200, or with entries from a copy of the cache 130 that was created previously. Accordingly, the cache 130 is "primed" when the DBMS 105 is initiated. By utilizing the cache 130 according to the embodiment described above, access to the association table 200 is minimized. By minimizing such access, the conversion from strings to StringIDs is faster and less costly.

An improved method and system for processing structured documents stored in a database is disclosed. According to an embodiment, a global association table 200 is provided to store strings and their respective StringIDs. In the embodiment, the strings correspond to element names, attribute names, and namespaces found in documents stored in the database, Because a global association table 200 is utilized, a StringID for a particular string can be used in place of the string throughout the database, By replacing strings with their respective StringIDs, document processing and storage are significantly improved.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

The invention claimed is:

1. A non-transitory computer readable medium containing a computer program for processing a structured document, the computer program comprising instructions for:
    identifying a plurality of strings processed by a database;
    assigning an identifier to each of the plurality of strings;
    storing each of the plurality of strings and its assigned identifier in a table in the database, wherein at least one of the plurality of strings is not derived from one or more structured documents stored in the database and at least another of the plurality of strings is derived from the one or more structured documents stored in the database;
    utilizing the table during document processing;
    designating a status for each of the plurality of strings, wherein the status is one of a temporary status or a permanent status;
    storing the status in the table; and
    providing a cache in the database for storing a portion of the table, wherein utilizing the table during document processing comprises:
        receiving a query, wherein the query comprises a plurality of element, attribute, and namespace strings;
        transforming the query by replacing the plurality of element, attribute, and namespace strings with their respective identifiers; and
        processing the transformed query, and wherein transforming the query comprises:
        requesting an identifier for one of the plurality of element, attribute, and namespace strings in the query;
        checking the cache for the one string;
        returning an identifier assigned to the one string when the one string is located in the cache;
        performing a lookup on the table for the one string when the one string is not located in the cache;
        returning the identifier assigned to the one string when the one string is located in the table; and
        assigning a new identifier to the one string, storing the one string and the new identifier in the table, designating a status of the one string as temporary, and returning the new identifier when the one string is not located in the table.

2. The computer readable medium of claim 1, wherein utilizing the table during document processing comprises:
    receiving a request to store a structured document in the database, wherein the structured document comprises a plurality of element, attribute, and namespace strings;
    transforming the structured document by replacing the plurality of element, attribute, and namespace strings with their respective identifiers; and
    storing the transformed structured document in the database.

3. The computer readable medium of claim 1, wherein the at least one string is derived from a query to the database.

4. A non-transitory computer readable medium containing a computer program for processing a structured document, the computer program comprising instructions for:
    identifying a plurality of string processed by a database;
    assigning an identifier to each of the plurality of strings;
    storing each of the plurality of strings and its assigned identifier in a table in the database, wherein at least one of the plurality of strings is not derived from structured documents stored in the database and at least another of the plurality of strings is derived from the one or more structured documents stored in the database;
    utilizing the table during document processing;
    designating a status for each of the plurality of strings, wherein the status is one of a temporary status or a permanent status;
    storing the status in the table; and
    providing a cache in the database for storing a portion of the table, wherein utilizing the table during document processing comprises:
        receiving a request to store a structured document in the database, wherein the structured document comprises a plurality of element, attribute, and namespace strings;
        transforming the structured document by replacing the plurality of element, attribute, and namespace strings with their respective identifiers; and
        storing the transformed structured document in the database, and wherein transforming the structure document comprises:
    requesting an identifier for one of the plurality of element, attribute, and namespace strings in the structured document;
    checking the cache for the one string;
    returning an identifier assigned to the one string when the one string is located in the cache;
    performing a lookup on the table for the one string when the one string is not located in the cache;
    returning the identifier assigned to the one string when the one string is located in the table; and
    assigning a new identifier to the one string, storing the one string and the new identifier in the table, designating a status of the one string as permanent, and returning the new identifier when the one string is not located in the table.

5. The computer readable medium of claim 4, wherein transforming the structured document further comprises:
    checking a current status of the one string when it is located in the table; and changing the status of the one string to permanent when the current status is temporary.

6. A system for processing a structured document, the system comprising:
- a string identifier generator operable to identify a plurality of strings processed by the database and assign an identifier to each of the plurality of strings;
- a database in communication with the string identifier generator, the database including a table operable to store each of the plurality of strings and its assigned identifier, wherein at least one of the plurality of strings is not derived from one or more structured documents stored in the database and at least another of the plurality of strings is derived from the one or more structured documents stored in the database;
- a cache in communication with the string identifier generator and the database, the cache being operable to store a portion of the table, wherein the table and the cache are utilized during document process; and
- a storage mechanism in communication with the string identifier generator, the database, and the cache, the storage mechanism being operable to receive and store a structured document in the database, wherein:
  - the string identifier generator is further operable to designate a status for each of the plurality of strings, the status is one of a temporary status or a permanent status, and store the status in the table,
  - the string identifier generator is further operable to:
    - receive a request for an identifier for a string from the storage mechanism,
    - check the cache for the string,
    - return an identifier assigned to the string when the string is located in the cache,
    - perform a lookup on the table for the string when the string is not located in the cache,
    - return the identifier assigned to the string when the string is located in the table, and
    - assign a new identifier to the string, store the string and the new identifier in the table, designate a status of the string as permanent, and return the new identifier when the string is not located in the table.

7. The system of claim 6, wherein the string identifier generator is further operable to:
- check a current status of the string when it is located in the table; and
- change the status of the string to permanent when the current status is temporary.

8. The system of claim 6, wherein the at least one string is derived from a query to the database.

9. A system for processing a structured document, the system comprising:
- a string identifier generator operable to identify a plurality of strings processed by the database and assign an identifier to each of the plurality of strings;
- a database in communication with the string identifier generator, the database including a table operable to store each of the plurality of strings and its assigned identifier, wherein at least one of the plurality of strings is not derived from one or more structured documents stored in the database and at least another of the plurality of strings is derived from the one or more structured documents stored in the database;
- a cache in communication with the string identifier generator and the database the cache being operable to store a portion of the table, wherein the table and the cache are utilized during document processing;
- a compiler in communication with the string identifier generator, the database, and the cache, the compiler being operable to receive and process a query to the database, wherein the string identifier generator is further operable to:
  - receive a request for an identifier for a string from the compiler,
  - check the cache for the string,
  - return an identifier assigned to the string when the string is located in the cache,
  - perform a lookup on the table for the string when the string is not located in the cache,
  - return the identifier assigned to the string when the string is located in the table, and
  - assign a new identifier to the string, store the string and the new identifier in the table, designate a status of the string as temporary, and return the new identifier when the string is not located in the table.

* * * * *